(12) United States Patent
Ivanov

(10) Patent No.: US 7,057,580 B1
(45) Date of Patent: Jun. 6, 2006

(54) METHODS FOR FORMING/RECORDING EXTREMELY HIGH RESOLUTION AND 3D IMAGES AND DEVICES FOR SAME

(76) Inventor: Anatoly Gennadievich Ivanov, Sukhanova 6,7, Vladivostok (RU)

( * ) Notice: Subject to any disclaimer, the term of this patent is extended or adjusted under 35 U.S.C. 154(b) by 0 days.

(21) Appl. No.: 08/995,715

(22) Filed: Dec. 22, 1997

(30) Foreign Application Priority Data

Dec. 25, 1996 (RU) .................................. 96124653
Jan. 31, 1997 (RU) .................................. 97101772

(51) Int. Cl.
  *G09G 5/00* (2006.01)
(52) U.S. Cl. ............................. 345/4; 353/34; 348/750; 359/10
(58) Field of Classification Search ................. 345/4, 345/8, 55, 88, 5; 359/10, 35; 348/750–758; 353/34
See application file for complete search history.

(56) References Cited

U.S. PATENT DOCUMENTS

| | | | | | |
|---|---|---|---|---|---|
| 2,686,219 | A | * | 8/1954 | Lindenblad | .................. 348/750 |
| 5,467,104 | A | * | 11/1995 | Furness, III et al. | ............ 345/8 |
| 5,481,320 | A | * | 1/1996 | Konuma et al. | ............. 348/751 |
| 5,483,365 | A | * | 1/1996 | Pu et al. | ........................ 359/10 |
| 5,506,597 | A | * | 4/1996 | Thompson et al. | ........... 345/85 |
| 5,666,226 | A | * | 9/1997 | Ezra et al. | ................... 359/621 |

* cited by examiner

*Primary Examiner*—Jeffery A. Brier
(74) *Attorney, Agent, or Firm*—Darby & Darby

(57) ABSTRACT

A system and method for forming an optical image having a screen on which is displayed an image which is to be reproduced on an image display plane. The image on the screen is optically transmitted in the form of a plurality of blocks to the image display plane and a block deflecting system associated with the display plane receives the plurality of optically transmitted blocks and displays them in the proper order on the image display plane.

19 Claims, 3 Drawing Sheets

FIG. 1
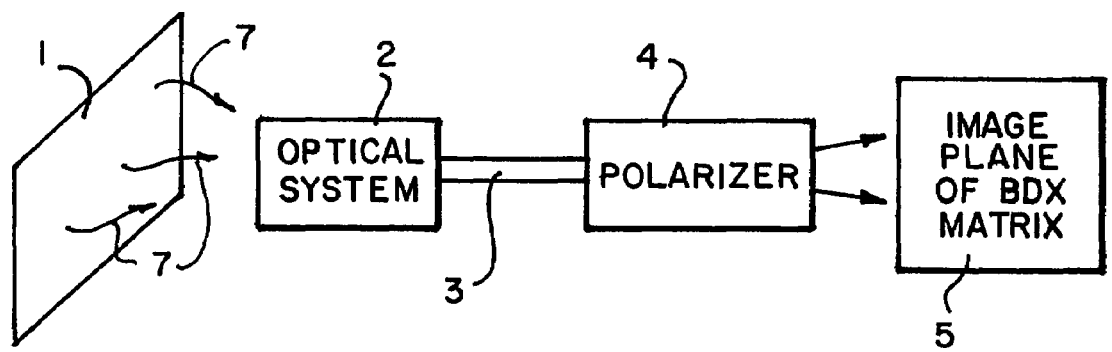
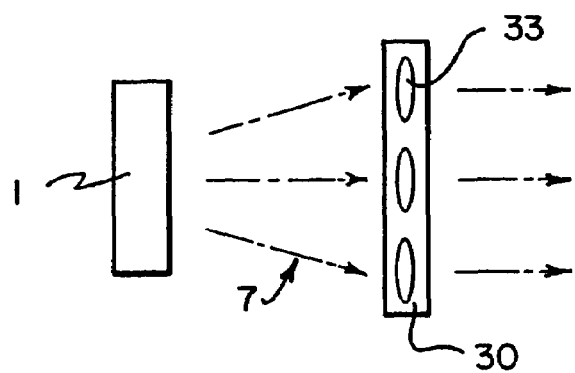
FIG. 4(b)

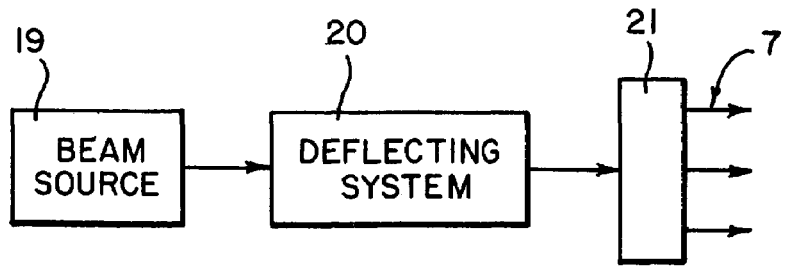
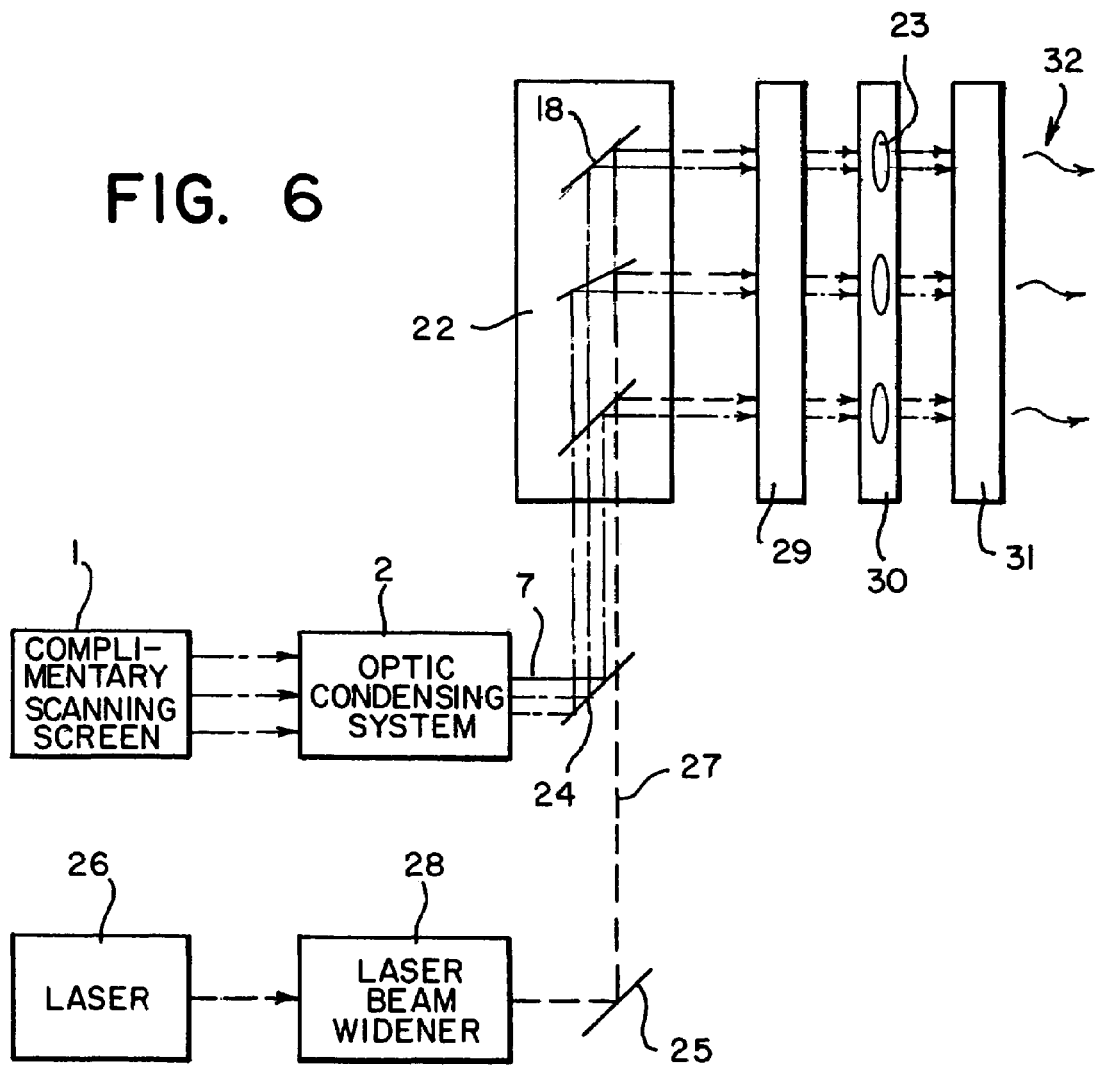

METHODS FOR FORMING/RECORDING EXTREMELY HIGH RESOLUTION AND 3D IMAGES AND DEVICES FOR SAME

FIELD OF THE INVENTION

The present invention relates to methods and devices for forming displaying/recording an image.

BACKGROUND OF THE INVENTION

A wide variety of image forming/recording devices are known. However, there are just a few methods for forming/recording images on which those devices are based. Methods for image forming basically can be divided into two parts: (1) physical principles of visualizing (there are several such methods), and (2) the manner of applying the signals, that is, methods of addressing display elements (there are a few such methods, such as scanning, multiplexed addressing, active addressing). The most widely used of these are analog addressing (scanning) and discrete (matrix x-y) addressing.

As to the methods for image recording, these are basically just a mirror image of the image forming methods and are also basically divided into scanning beam methods and matrix addressing methods. Each of the matrix methods for forming an image utilizes a row of special devices, whose constructions differ in some details but are based on the same working principle. For example, the method of x-y matrix addressing is carried out by a device having a matrix of discrete elements and row and column lines to apply signals to said elements. The scanning beam method is provided by a device having a scanning beam source, a sensitive display screen, and a focusing and deflecting system. Both of these methods may be called additive type methods, as a signal is simply applied (added) to a chosen display element of the display screen in order to activate it.

An important property in image formation is the resolution produced by a display. Sometimes the situation regarding resolution is even paradoxical. That is, computer displays, the devices most frequently used with computers, have much less resolution than other computer peripherals, such as printers, scanners, etc. It is customary to consider that the resolution of a display is primarily a technological problem. For example, in the case of matrix devices it is limited by the number of elements of the device. When dealing with a small size display, the size of whose elements is small. It also can be shown that resolution is related to the addressing technique. For example, in matrix devices that contain a large array of small size elements of less than a million such elements, such as in active matrix thin film transistor (TFT) liquid crystal displays, the technology of producing such a display and its matrix addressing circuits is complex, making the display rather expensive.

Also, there are cases where it is highly complex, or even impossible from the level of existing technology, to produce large multi-element displays, as in the case of light emitting diode (LED) displays. Furthermore, increasing the number of elements also increases the complexity of the system and consequently the probability that some of the elements might break down over time.

In the case of devices based on a scanning method, higher resolution may be obtained than can be achieved in matrix devices. Here the resolution is determined by the diameter of the scanning beam and scanning frequency. But scanning based devices generally cannot be made light-weight and flat and usually require high voltage for operation. Moreover, in devices having a cathode ray scanning beam, the electrostatic repulsion of electrons hinders reducing the beam diameter. Devices using a coherent light scanning beam also have relatively large dimensions, a small beam deflection angle, and a complex control system.

Another aspect concerning resolution comes into play while displaying (or recording) full motion video. For example, in motion pictures played back at 30 frames per second, the higher the resolution (the number of pixels), the higher must be the speed of pixel addressing. A customary way to do this is to increase the speed of applying signals (frequency increase). But this decreases the time during which a signal is applied to a pixel, which is not always compatible to improving resolution.

Apart from above cited additive type methods, a recent method for rapid addressing of display elements forms a picture using the procedure of reverse orthogonal transformation (ROT) of a data signal compressed by orthogonal transformation (OT). A compressed data signal contains many fewer signal components than a non-compressed one so fewer steps are needed to address all the display elements while the procedure of ROT is performed directly in the display elements. This is an example of a multiplication type method where the signals applied to each display element are multiplied in the element. The method comprises the procedure of inner matrix multiplication of the data signal matrix and the address signal matrix. Such a method and apparatus therefor are described in U.S. application Ser. No. 08/464,900, filed Jul. 3, 1995, assigned to the same assignee. But this method is valid only for matrix devices and though it provides an increase in the speed in presenting the image display, it requires a more complex electronic circuit scheme for an element than in, for example, an additive type TFT active matrix display, and this consequently occupies more space in the display and leads to a decrease in display device resolution.

Therefore, a need exists for a light and flat device for image forming and image recording having a simple structure, a minimized number of active elements, and that produces a resolution close to the resolution obtainable with photographic techniques.

SUMMARY OF THE INVENTION AND OBJECTS

An object of the present invention is to provide an image forming/recording method and devices therefor having novel and improved characteristics which are not obtained by the conventional image forming/recording methods and devices. The method and devices of the invention provide increased image forming/recording speed, combined analog and discrete matrix control of pixels, a reduced number of matrix active elements, and the possibility for image forming/recording directly through OT procedure, while having extremely high resolution.

According to the present invention, there is provided a method and device for forming an image that comprises forming an image on an image plane by forming constituent blocks of the image. Each block is formed using at least one complementary screen and the blocks are displayed on the image plane by way of a block deflecting system. The complementary screen comprises a display (e.g., an LED matrix, injection laser matrix, etc.) producing an optical picture having a resolution that corresponds to the resolution of a block (e.g., rectangular area) to be produced on the image plane.

The blocks are formed one by one on the complementary screen and are then projected, each in its proper place, for the final image on the image plane. In one embodiment of the invention, a deflecting system matrix (matrix of discrete type deflectors) covers the entire image plane, that is, the deflecting system is of the size of the image plane. Each deflector covers (is of the size of) an area of a block. Electric signals are applied to appropriate row and column lines of a deflecting system matrix for the deflectors and reflect the formed block onto its proper position on the image plane.

According to another aspect of the present invention, there is provided a method and device for forming an image that comprises forming an image on an image plane by parallel forming of constituent blocks of an image through scanning the image plane with the help of a complementary scanning screen having a resolution that corresponds to the resolution of a block of an image screen. In the method and device the scanning beam for a scanning screen is divided into multiple components by a block deflecting system and each component of an image is placed into the same point in its corresponding block of an image plane for displaying the complete image. While activating different points of the scanning screen, each corresponding component scans its own block of the image plane.

According to further aspects of the present invention, there is provided a method and device for electronic image recording in which an image is recorded through parallel scanning of an image plane by constituent blocks of an image by dividing the scanning beam into multiple components so that each of the components scans its corresponding block of the complete image.

According to still a further aspect of the present invention, there is provided a method and apparatus for electronic image recording that comprises an image formed of constituent blocks wherein the scanning pattern is produced with the help of a complementary scanning screen and is deflected to the appropriate block of the final image using a block deflecting system.

One embodiment of the invention uses two low resolution screens and a procedure that includes multiplying the number of elements of one screen with the number of elements of the other screen to obtain an extremely high resolution screen having a number of elements equal to a multiplication of the above two numbers (multiplication of the resolutions).

According to still another embodiment of the present invention, devices and methods are provided for forming and electronically recording an image which comprise an image plane on which the image is present, a complementary scanning screen, and a block deflecting system.

BRIEF DESCRIPTION OF THE DRAWINGS

Other objects and advantages of the present invention will become more apparent upon reference to the following specification and annexed drawings, in which:

FIG. 1 is a schematic block diagram of the basic structure of the invention.

FIG. 4(b) is a modification of the BDS elements of FIG. 4(a);

FIG. 5 is an embodiment of a complementary screen;

FIG. 6 shows a holographic variant of an image forming device;

DESCRIPTION OF THE PREFERRED EMBODIMENT

Figure 2:
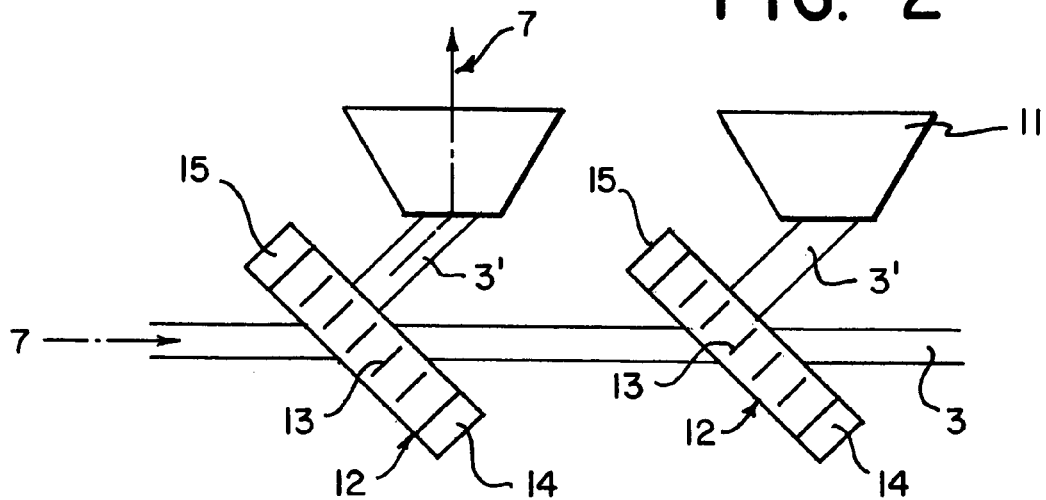
FIG. 2 is transverse view of another embodiment of a BDS elements.

Referring to the drawings, FIG. 1 shows the basic structure of a device according to the present invention, which also can be used to implement the invention. Reference numeral 1 denotes the complementary scanning screen, 2—an optic condensing system (optional), 3—an optical transmission cable (optional), 4—a polarizer (optional), 5—the image plane on which the final image of higher resolution is to be formed, 6—BDS (block deflecting system) matrix elements (described below), and 7—scanning light beams.

In FIG. 1, the complementary screen 1, illustratively is a display formed in a matrix of elements connected to row and column lines. Matrix element addressing is performed by applying to the row and column lines appropriate signals for controlling the light emitting elements. The complementary screen 1 produces an optical picture that corresponds to a block of the image plane 5 on which the complete image is formed. The picture on screen 1 is formed either by any traditional addressing technique or speeded addressing using an orthogonal transformation OT addressing procedure, as described in the aforesaid prior application. Display 1 can be either a matrix of light emitting elements (e.g., an array of LED devices, injection lasers, etc.), or a matrix of elements that controls light transmission and light reflection. An outer signal (e.g., a video signal received by cable, RF transmission, etc.) is presented on complementary screen 1 (or computer transformed) in a manner to be broken up into the sequence of the blocks to be displayed on the image display 5.

An illustrative physical size of a block corresponds to the size of the complementary screen 1, e.g., 2.5×2.5 cm having 100×100 pixels–4 pixels per mm/. In order to increase brightness and the pixel density, the image of the block on the complementary screen 1 can be optically compressed, e.g., 0.5×0.5 cm–20 pixels per mm, to suit the size of a block to be finally displayed on the image plane 5.

The complementary screen 1 has a deflector system comprising a matrix of 100×100 elements, i.e., to correspond to 100×100 blocks. Each element is of the size of a block, so that the total screen size of 50×50 cm one obtains is $10^4$ pixels in a block compared to $10^3$ pixels to the total display.

An image formed on the blocks of complementary screen 1 is optically transmitted to a BDS matrix that adjoins the image plane 5. The BDS matrix has a number of elements corresponding to the number of blocks that are to be formed on image plane (e.g., in the case of 100×100 blocks it has 100×100 elements). Each of the BDS matrix elements deflects the elements of the block for forming an image on the image plane so that the image formed by the image plane blocks cover the whole plane.

The image forming/recording procedures and devices of the invention utilize multiplication procedures based on outer matrix multiplication. Consider that A is a matrix representative of a complementary screen 1 matrix comprising N·N elements, $A=\{a_{i,j}\}$; $i,j=1,N$. An element of matrix A corresponds to a pixel of the block formed on the complementary screen 1.

D is a matrix representative of a deflecting system (operator) matrix comprising P·P elements, $D=\{d^{k,1}\}$; $k,1=1,P$. An element of matrix D corresponds to a block of a matrix B.

B is a matrix representative of an outer multiplication of matrix D with matrix A comprising M·M elements divided into P·P blocks each having N·N elements, $B=\{b^{k,1}_{i,j}\}$; $i,j=1,N$; $k,1=1, P$, an element of matrix B corresponds to a pixel of an image plane.

For example, in a case where N=100, P=100, the number or elements of the matrix A=N×N=10,000, of the matrix D=P×P=10,000, and the total number of pixels obtained on image plane 5, representative of matrix B=NP×NP=100,000,000. This is the number of discrete elements that have a common matrix screen with the same resolution should have. In the example described, there are only 20,000 discrete elements for the same discrete addressed screen (this points out the technological gain and simplicity).

A light beam 7 is emitted from each light emitting element (pixel) of the complementary screen 1 and the light beam is amplitude modulated in proportion to the voltage applied to that element to control its information display content, e.g., color, hue, grey scale, etc. In order to increase the density and increase brightness of each complementary screen 1 element (pixel), an optic condensing system 2 may be used. Light beams formed on the complementary screen image 1, passing through condensing system 2 are compressed to form an image of smaller size than that appearing on complimentary screen 1.

The blocks of the complete image formed on complementary screen 1 are to be transferred to and displayed on the image plane 5 in a block by block sequence. Where the complementary screen 1 is located at a distance from the image plane 5, a light conductor 3, e.g., fiber optic cable, is used to transfer a formed block of an image from screen 1 to the image plane 5 where the complete image is to be formed. The complete image is displayed in blocks in their proper places on the image plane 5 through a matrix of BDS elements, described below. The light conductor 3 can include the necessary conventional optic elements—e.g., focusing cone, self focusing optic cable lens, etc., for further block image compression.

The proper place to display each block on image plane 5 is selected by applying voltage to the proper element (deflector) of the BDS matrix. Where necessary, special fluorescent covering of the image plane is used in order to transform coherent directed light into non-coherent dispersed light or to transform non-visible light produced by the complementary screen 1 into visible light, e.g., a liquid crystal image transformer may be used as an image plane. This uses the electro-optical effect in liquid crystals when falling light changes the conductivity of the photoconductive layer and potential relief of an adjacent liquid crystal layer that leads to an electro-optical effect in the liquid crystal layer that results in appearance of an image that can be directly viewed. The procedure is repeated for forming the entire image on image plane 5 block by block.

The BDS matrix is made in the form of a matrix of discrete type deflectors, e.g., acoustic optical deflectors, electro-optical deflectors, liquid crystal deflectors, etc., comprising line elements that deflect light produced by complementary screen 1 image into the appropriate line of the deflecting system matrix, and plane elements that deflect the light from the line onto the image plane 5 to reproduce the block of the image on the image plane. The BDS deflectors are connected to appropriate row and column lines and driven by electric signals applied to these lines.

The incident light beam received by the BDS element from the complementary screen 1 is divided into ordinary and extraordinary ray components. An extraordinary ray component 7 is deflected to the reflecting area of the mirror 8 from which it is reflected and falls onto the image plane 5. An ordinary ray component has another trajectory and can be eliminated using the polarizer 4. This is an optic polarizing filter that passes light with the proper fixed orientation of its polarization plane. That is, the ordinary rays do not produce any effect on the image plane 5. The ordinary rays are eliminated, e.g., by the use of a polarizer, and the resolution can be improved by the use of the condensing system 2 and by increasing the number of BDS matrix elements.

Figure 3:
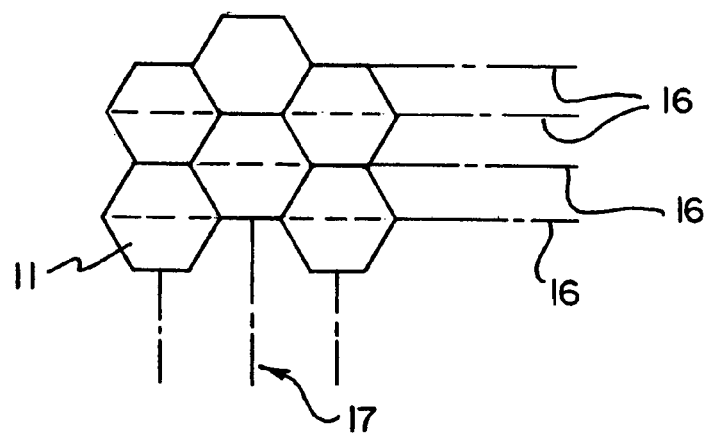
FIG. 3 is front view of a further embodiment of a BDS elements.

An embodiment of a BDS element is shown in FIG. 2 (transverse view) and FIG. 3 (front view). Here, a BDS element that corresponds to each element of the complementary screen image block comprises an acoustic-optical deflector 12 in which an acoustic wave 13 is produced using a piezoelectric element 14. The acoustic wave is received by a sound wave acceptor 15. Each deflector is connected to light conductors 3. By applying an electric signal to a piezoelectric element 14 using a row and column matrix addressing system, the chosen deflector 12 is activated and the received light beam 7 is refracted by the sound wave and deflected into a light conductor 3', whose end has a focusing cone 11 (light conductor that widens along the light beam axis diameter). The focusing cone transforms the size of the transmitted part of the image in the conductor 3' so that it will correspond to the size of a block of an image to be displayed on the image plane 5.

The optical outputs 11 of the BDS matrix elements should be of a shape such that the blocks of the image produced by the matrix of elements covers the entire image plane surface 5. For example, the cones 11 can be hexagonal shaped as shown on FIG. 3 having the row and column lines 16, 17 to which deflector controlling electric signals are applied. A number of the cones would comprise a single block and a plurality of such blocks comprise the image plane 5 for the complete image.

To further explain, each cone comprises a block. Deflectors 12 are activated by electric signals, applied e.g., through a common transistor matrix having row and column lines 16, 17 (each transistor connected to a corresponding deflector). In the described example, the cones themselves can form the image plane 5.

The resolution of the complementary screen 1 is multiplied by the number of deflectors comprising the BDS matrix. The image is formed consequently block by block, activating deflectors one by one and each block has a resolution of a screen block.

Instead of a matrix formed complementary screen 1, a non matrix collimated light beam may be used for the producing the screen. This is, for example, referring to FIG. 5, an active element 21 on the base of a semiconductor laser (similar to one used in laser projection devices) that is scanned by a cathode ray beam, produced by the beam source 19 and deflected by the deflecting system 20, producing an output having a resolution equal to that of a block of an image plane. An example of a non-matrix complementary screen 1 is a "quantoscope" in which a cathode ray beam scans a semiconductor layer and induces laser radiation. This is a well known device.

In order to speed the image forming, more than one complementary scanning screen 1 may be simultaneously used and more than one BDS used to form blocks of an image on the image plane 59. That is, several blocks can be scanned from the complementary screen 1 and several blocks reproduced on the image plane 5 by several of the BDS devices at the same time.

A method for image recording is similar to that of image display as described above. To accomplish image recording, the light beams from different elements of a complementary scanning screen 1 scan a type of an image plane that can result in formation of output electric signals. This type of image plane is, for example, a photosensitive target where an electrostatic image is formed corresponding to the received light image. Commutation of the image elements is performed either by transforming the scanning light beam into an electron beam through an outer photoeffect or using a directly scanning light beam to commute image elements through an inner photoeffect.

For example, an image plane may comprise two separated photosensitive layers having a non-transparent conductive layer therebetween. Image forming light falls onto the outer photosensitive layer and changes its conductivity proportional to luminosity (light, color intensity). A scanning beam from the complementary screen changes the conductivity of the inner photosensitive layer. The non-transparent conductive layer placed therebetween hinders mixing of scanning and outer image forming light and closes the circuit. The resulting output electric signal is proportional to the current value, and consequently to luminosity, produced by the light received by the outer image forming layer of the image plane. The resultant signal is outputted block by block. Block scanning may be performed either point by point or by using different scanning masks corresponding to different OT basic functions—scanning with the transformation.

The above describes the process of transforming a light image into an electric signal. The output electric signal can be then recorded in a suitable recording medium—magnetic tape, etc. The resolution can be increased due to the manner of scanning—by optic compression scanning of the raster with the help of a condensing system 2. It is easier and more effective to decrease the diameter of the light dot by optic methods than to decrease the diameter of the electron beam and increase the number of image plane scanning points, which is equal to the multiplication of the complementary screen 1 pixels to the number of BDS matrix elements.

Another embodiment of the image forming/recording uses parallel image plane scanning and utilizes another construction of the BDS matrix element. The principle of parallel image plane scanning is illustrated in FIG. 4(a).

Here, in an embodiment of a BDS matrix element, the elements (pixels) of the complementary scanning screen 1 are activated one by one. The light beam emitted by each complementary screen element (pixel) is separated by plane BDS elements into the number of components and each component is deflected into a corresponding block and corresponding element of the block of the image plane. The BDS matrix is preferably located behind the image plane.

All of the elements of the complementary screen 1 are activated one by one. By scanning the whole image plane 5, output signals are independently outputted from all of the scanned blocks of the image plane.

Figure 4A:
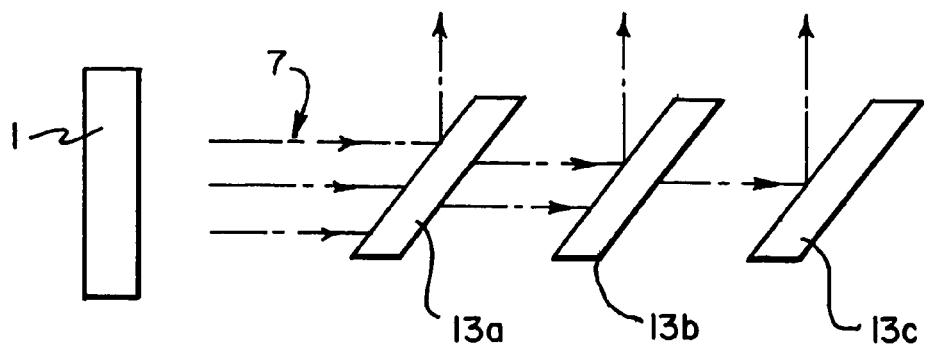
FIG. 4(a) is another variant of a BDS elements.

Here, as shown in FIG. 4(a), BDS elements 18 are made in the form of partly transparent mirrors with coordinated coefficients of light transmission and light reflection. For example, there are three mirrors 13a, 13b, 13c in a line of a block deflecting system matrix that receives the light rays from the complementary screen 1. The first mirror 13a reflects ⅓ and transmits ⅔ of the light beam, the second mirror 13b reflects ½ and transmits ½ of the light passing through the first mirror, and the third mirror 13c reflects all of the light it receives and transmits none, so that each mirror reflects a light beam of equal intensity. The light rays 7 reflected from the mirrors are directed to fall onto the display screen 5.

FIG. 4(b) illustrates an arrangement where all the constituent blocks of the image plane are all scanned together in parallel. Complementary screen 1 this time forms a raster image (e.g., TV raster), so that each mirror deflects a corresponding part of the light emitted from screen 1 into the corresponding block of image plane 5 (each mirror corresponds to a block of an image plane). In the case of image recording, mirrors can be placed directly behind the image plane associated, if necessary, with light focusing plate 30. In the case of image forming, there should be additionally used a space-time modulator—a matrix comprising an array of light modulators—placed between the image plane and the BDS matrix in order to independently modulate (gray scale, hue, etc.) the raster forming light in each block.

The BDS matrix that comprises light dividing elements (that partly transmit partly reflects falling light) may be called an image multiplying matrix (IMM). The IMM multiplies falling light into a number of components corresponding to the number of elements of the matrix. Another variant of an IMM is a lens raster.

Along with a planar variant construction of image multiplying matrix (IMM) (FIG. 4(a)), where light direction is perpendicular to the IMM place, there may also be a non-planar variant where the light direction is mostly perpendicular to the IMM plane (FIG. 4(b)), e.g., presented by lens raster matrix 30 where light 7, formed by the image producing mean 1, is divided into the number of components corresponding the number of lenses 33.

In case of image forming, light amplitude is modulated in each block separately and simultaneously (this time each of the BDS matrix elements apart from mirror deflector thus must comprise a light modulator). This modulation can be performed using customary used procedures for light beam amplitude modulation, so that electric signals controlling the process of modulation are supplied to each block separately.

Though passive element block deflecting systems can provide higher resolution because of more simple construction of block deflecting system matrix elements, and consequently possible higher degree of compression of the complementary scanning screen image, scanning with a transformation cannot be implemented.

According to image/recording method and devices of the present invention, the number of active elements are minimized, resolution increased considerably, and the device can be of low weight and small size.

FIG. 6 shows a holographic variant of an image forming device. The elements are: 1—complementary scanning screen, 2—optic condensing system, 7—hologram forming light, 18—light dividers, 22—light multiplying matrix, 23—focusing elements, 24, 25—mirrors, 26—laser, 27—image restoring light, 28—laser beam widener, 29—light modulating screen, 30—a holographic optic element matrix (focusing plate), 31—hologram forming plane, and 32—holographic image forming light.

On complementary scanning screen 1 is presented a high resolution display (e.g., 5×5 cm, 2500 lpi). This display is produced by a cathode ray tube, laser projection system, etc. That is, a high resolution raster picture of a block of an image to be formed is created. The block of the complementary screen 1 is optically condensed to obtain a resolution needed for holography (e.g., a block of 0.5×0.5 cm, 25,000 lpi). To explain further, a hologram-3D picture is formed as a result of diffraction of coherent light on a periodic structure (e.g., formed on a film). In order for the diffraction to take place, a typical light wavelength, $0.4-0.7 \times 10^{-6}$ m the period of the periodic structure should be comparable to that of the light wave. The resolution 25,000 lpi–$10^{-6}$ m is the minimal resolution needed for holography. The compressed block image is transmitted by reflection from mirror 24 to the deflecting matrix 22, in which it is multiplied by light dividing matrix elements 18 into many blocks covering the whole plane of the matrix 22. Screen 1 forms a raster picture (e.g., TV line raster), each raster forming dot is divided by elements 18 of IMM 22 into a number of components, corresponding to the number of blocks to be formed on plane 31, so that each component simultaneously forms a raster in its corresponding block. All of the blocks together cover the whole image plane.

The light modulating screen 29 (space-time modulator) receives the light from the light deflection matrix 22 and is a two coordinate matrix of light modulators. To form a periodic picture peculiar to each block, a raster should be amplitude modulated in each block independently. This is done using a space-time modulator—a matrix comprising an array of light modulators, so that one modulator corresponds to one BDS matrix element and one block to be formed. The light modulators are devices containing modulating media with optic characteristics controlled by electric signals. Each light modulator element can be driven with control signals, which are either computer calculated or transmitted by radio, independently, according to the signals applied. Each light modulator element modulates the received light into a holographic (i.e., interference type) representation that corresponds to the appropriate part of a hologram proper to each block.

The holographic optic element matrix 30 focuses each block image onto the hologram forming plane 31. This plane 31 has, for example, a layer of photochrome material sensitive to complementary screen emitted light. Thus, on hologram forming plane 31 is formed a large scale hologram presenting an array of (e.g., 50×50) small blocks covering the whole plane surface (this time 25×25 cm). The matrix of holographic optic elements 31 focuses light in a narrow spectral interval corresponding to specter emitted by complementary scanning screen 1. That is, it should not focus image restoring light 27 (this is a limitation present in a compact construction of the screen where the same deflecting matrix 22 is used to form both hologram and restoring light). In other variants e.g., matrix 22 is used only to form a hologram and restoring light 27 flooding plane 31 is formed by any of the different ways may as well be used lens matrix.

In essence, elements 23 of focusing plane 30 should focus only periodic picture forming light 7, but not image restoring light 27. This can be done using the holographic optic elements.

Laser 26 produced coherent light 27 after diffraction on hologram plane 31, produces a three dimensional (3-D) image formed by diffracted light 32. The image may be viewed directly or projected onto a large screen by a projection system. The use of three lasers, one for each color component, allows formation in the same way of a 3-D color image. As a holographic image restoring light may be also used that produced by mercury vapor lamp.

Instead of matrix of light dividing elements as well can be used a lens raster matrix, e.g., FIG. 4(b), having one lens for a block, naturally lenses may be substituted by holographic optic elements, i.e., light focusing holograms. Method presented comprises immediate synthesizing of a hologram without the use of reference beams.

In methods for parallel image forming and recording, image producing mean is used to form pattern image (PI) that is further (in case of image forming) to be modulated, e.g., PI may present a point-like raster, line raster or a Fourier raster. The first two are space-time separated in respect to plane 31 of FIG. 6. The raster points are consecutively activated and do not overlap on plane 31, the latter one is just time separated—each raster element may occupy the sole plane 31, and the image F(x,y) is formed by multiple exposition of such modulated elements. In other words, the image F(x,y) can be formed either by modulating line raster or forming a sum of modulated OT (orthogonal transformation) basic functions (BF) as in the above mentioned application. $F(x,y)=\Sigma a_n \phi_n(x,y)$ where BF $\phi_n(x,y)$ presenting, e.g., two periodic sinusoids that are formed on screen 1. Modulating coefficients an are set independently for each block by space-time modulator 29.

In case the resolution of the described holographic device is high enough, there is a possibility of not only electronically forming a visual holographic picture but also obtaining its hard copy, i.e., the holographic device used for forming the image may be used as a part of a holographic printing device. In general, there are two kinds of holograms: those needing coherent light for visualizing and those that can be visualized in daylight. The first are mostly plane holograms—a diffraction picture is a plane diffraction picture produced in a thin photoemulsion layer of a film. The second are non-plane—a diffraction picture is a 3-D diffraction picture produced in a thick photoemulsion layer of a film and presents multiple diffraction layers. To form a hologram of this type a coherent light reflected from an object and that not reflected fall onto opposite sides of a film).

A holographic image formed on a device is similar to that produced by a real object lighted with a coherent light. It also may be projected on a front surface of a thick photoemulsion film. The back surface of a film is illuminated with the same coherent light, produced by an image restoring light source, that is dispersed with help of, e.g., the IMM of FIG. 4(a). In a thick photoemulsion layer of a film there is then formed a 3-D hologram that is further to be processed in a customary way in a photodeveloping machine to make a hard copy of a holographic image that can be viewed in daylight.

Specific features of the invention are shown in one or more of the drawings for convenience only, as each feature may be combined with other features in accordance with the invention. Alternative embodiments will be recognized by those skilled in the art and are intended to be included within the scope of the claims.

All cited documents are incorporated by reference in their entirety. In case of conflict, the present specification controls.

I claim:

1. An image display system for forming an image on a single image display surface by image blocks comprising:
   (a) at least one complementary screen of one of light emitting or light source modulating devices producing light in a two dimensional array of N (a real number) pixels, from which array of pixels a plurality of raster elements are generated;
   (b) a raster multiplying system for parallel scanning image blocks of a single image display surface comprising an array of optically interrelated light dividing elements, each said light dividing element to divide the light of said plurality of raster elements of the complementary screen into parts, a first section of said array arranged to directly receive light from said complementary screen, a part of which directly received light is passed to at least one other section of said array, the light directly received by said first section of said array and the light passed to said at least one other section of said array divided into components to form copies of the raster elements, with said copies of said raster elements forming corresponding raster elements in P image blocks, each block of said P image blocks generally comprising a two dimensional array of said raster element copies;
(c) an array of controllable modulators located after said raster multiplying system, each modulator of said array to independently modulate the raster elements of one of said P image blocks so that light in each block is modulated separately and simultaneously; and
(d) a single image display surface on which said P image blocks of a total number of M pixels are formed and displayed, where the number M exceeds the number N and where said surface preceding components of (a), (b) and (c) are placed in the mentioned order of the light path of the complementary screen.

2. A system as in claim 1, further comprising a plurality of said complementary screens.

3. A system as in claim 1 used for image recording further comprising:
(e) instead of said single image display surface a photosensitive plane on which an outer image to be recorded is produced, said outer image comprising a plurality of said image blocks, each image block being of a two dimensional array of pixels, and all said image blocks comprising said M pixels, where the number M exceeds the number N, and where said system components of (a), (b) and (c) are placed in the mentioned order of the light path of the complementary screen; and
(f) means to scan said outer image on said photosensitive plane into electric signals for recording.

4. A system as in claim 3 further comprising a plurality of said complementary screens.

5. A system as in claim 3 further comprising means for optic compression of said plurality of generated raster elements for increasing the brightness and pixel density of a scanning light beam.

6. A system as in claim 1 further comprising means for optic compression of complementary screen raster elements for increasing brightness and pixel density.

7. A system as in claim 1 further comprising partly transparent mirrors as said light dividing elements.

8. An image display system as claimed in claim 7 further comprising a light conductor to transmit the light from said complementary screen to the single image surface via said raster multiplying system light receiving part.

9. A method for forming an image on a single image display surface by forming a plurality of blocks of said image, so that the image is presented as comprised of a plurality of image blocks, comprising the steps of:
(a) providing at least one complementary screen having a two dimensional array of N pixels and generating from said array of pixels a plurality of raster elements;
(b) using a raster multiplying system for parallel scanning image blocks of the single image display surface comprising an array of optically interrelated light dividing elements arranged so that a first section of said array directly receives light from said complementary screen light and passes another part of the directly received light to another section of said array, dividing the light directly received by said first section of said array and the light passed to said at least one other section of said array into components to form copies of the raster elements, said copies of said raster elements forming corresponding raster element in P image blocks, each block of said P image blocks generally comprising a two dimensional array of raster element copies;
(c) independently modulating said beam components corresponding to the raster element copies of each of said P image blocks;
(d) repeating the procedure of generating other raster elements from said complementary screen; and
(e) displaying the P image blocks having a total number of M pixels on the single image display surface, where M is greater than N.

10. A method as in claim 9 further comprising the step of using a plurality of said complementary screens.

11. A method as in claim 9 wherein a said raster element comprises more than one pixel.

12. A method as in claim 11, further comprising the step of subjecting a said generated raster element to additional optical compression for increasing the brightness and pixel density of a sensitive plane scanning beam.

13. A method as in claim 9 wherein a said raster element is of the size of only one pixel.

14. A method as in claim 9 used for image recording wherein said single image display surface of step (e) comprises a photosensitive plane on which an outer image is produced and further comprising that step (b) is followed by:
(f) converting the image information received on said photosensitive plane by the projection of said beam components into P electric signals, one signal for one of said P image blocks, for recording received information for P separate image elements; and
(g) repeating the procedure by successively generating other raster elements on said complementary screen, to simultaneously scan each of said P image blocks.

15. A method as in claim 14 wherein a said raster element comprises a plurality of pixels.

16. A method as in claim 9 further comprising the step of generating a 3D image from said single image display surface.

17. A method as in claim 9 further comprising the step of subjecting said plurality of raster elements of said complementary screen to additional optical compression for increasing brightness and pixel density.

18. A method as claimed in claim 9 further comprising using a light conductor to transmit the light from said complementary screen to said single image display surface via said raster multiplying system light receiving part.

19. A 3D holographic image display system comprising:
(a) at least one complementary screen of one of light emitting or light source modulating devices in a two dimensional array of N (a real number) pixels, from which array of pixels a plurality of raster elements are generated;
(b) a raster multiplying system for parallel scanning of hologram blocks of a single surface comprising an array of optically interrelated light dividing elements, each said light dividing element to divide the light of said plurality of raster elements of the complementary screen into parts, a first section of said array arranged to directly receive light from said complementary screen, a part of which directly received light is passed to at least one other section of said array, the light directly received by said first section of said array and the light passed to said at least one other section of said array divided into components to form copies of said generated raster elements of a said at least one complementary screen, with said raster element copies forming a raster in P hologram blocks with each block generally comprising a two dimensional array of said raster element copies;

(c) an array of controllable modulators located after said raster multiplying system, each modulator of said array to independently modulate the raster elements of one of said P hologram blocks;

(d) a single surface on which a hologram of said P hologram blocks of total number of M pixels are formed, where the number M exceeds number N and where said surface preceding components of (a), (b) and (c) are placed in the mentioned order of the light path of the complementary screen; and (e) a coherent light producing means for producing a 3D holographic image from said P hologram blocks of said single surface.

* * * * *